US010952031B2

(12) United States Patent
Maaref

(10) Patent No.: US 10,952,031 B2
(45) Date of Patent: Mar. 16, 2021

(54) LICENSED-ASSISTED USER EQUIPMENT COOPERATION IN UNLICENSED SIDELINK

(71) Applicant: Amine Maaref, Ottawa (CA)

(72) Inventor: Amine Maaref, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 170 days.

(21) Appl. No.: 15/160,607

(22) Filed: May 20, 2016

(65) Prior Publication Data

US 2017/0339530 A1    Nov. 23, 2017

(51) Int. Cl.
*H04W 4/06* (2009.01)
*H04W 74/08* (2009.01)
*H04L 5/00* (2006.01)
*H04L 27/26* (2006.01)
*H04W 74/00* (2009.01)
(Continued)

(52) U.S. Cl.
CPC .............. *H04W 4/06* (2013.01); *H04L 5/0033* (2013.01); *H04L 5/0048* (2013.01); *H04L 5/0055* (2013.01); *H04L 5/0082* (2013.01); *H04L 27/26* (2013.01); *H04W 74/08* (2013.01); *H04W 74/0808* (2013.01); *H04L 5/0023* (2013.01); *H04L 5/14* (2013.01); *H04L 12/189* (2013.01);
(Continued)

(58) Field of Classification Search
CPC ....... H04W 4/06; H04W 74/08; H04W 16/14; H04L 12/189; H04L 5/0055
See application file for complete search history.

(56) References Cited

U.S. PATENT DOCUMENTS

2008/0081652 A1    4/2008    Kennedy
2015/0055541 A1    2/2015    Zhang et al.
(Continued)

FOREIGN PATENT DOCUMENTS

CN    101042862 A    9/2007
CN    101355724 A    1/2009
(Continued)

OTHER PUBLICATIONS

Amine Maaref et al., Device-Centric Radio Access Virtualization for 5G Networks, Globecom 2014 Workshop—Emerging Technologies for 5G Wireless Cellular Networks.*
(Continued)

*Primary Examiner* — Jeffrey M Rutkowski
*Assistant Examiner* — Chae S Lee

(57) ABSTRACT

Methods and devices are provided to enable a cluster of user equipments (UEs) to receive a multicast signal over a first spectrum band and access a second spectrum band as a single virtual entity for device-to-device (D2D) mutual broadcast within the cluster. In an embodiment, a first UE in a cluster receives a multicast signal from a wireless network over the first spectrum band, the multicast signal including downlink information targeted to a second UE in the cluster. The first UE performs in a contention procedure for a transmission opportunity (TXOP) in the second spectrum band in accordance with group listen-before-talk (LBT) parameters configured for the cluster. If the contention procedure has acquired a TXOP in the second spectrum band for the cluster, the first UE sends at least a portion of the downlink information to the second UE over the second spectrum band during the TXOP.

31 Claims, 11 Drawing Sheets

(51) Int. Cl.
*H04L 5/14* (2006.01)
*H04L 12/18* (2006.01)
*H04W 16/14* (2009.01)

(52) U.S. Cl.
CPC ......... *H04L 27/2643* (2013.01); *H04W 16/14* (2013.01); *H04W 74/006* (2013.01)

(56) References Cited

U.S. PATENT DOCUMENTS

| | | | |
|---|---|---|---|
| 2015/0117377 A1* | 4/2015 | Maaref | H04W 72/121 370/329 |
| 2015/0282045 A1* | 10/2015 | Salem | H04W 40/10 370/329 |
| 2016/0112992 A1* | 4/2016 | Bhushan | H04L 5/0042 370/330 |
| 2016/0360553 A1* | 12/2016 | Cheng | H04W 16/14 |
| 2017/0230941 A1* | 8/2017 | Agiwal | H04W 72/04 |
| 2017/0311227 A1* | 10/2017 | Kim | H04W 40/10 |
| 2017/0311320 A1* | 10/2017 | Lunttila | H04W 16/14 |
| 2017/0331670 A1* | 11/2017 | Parkvall | H04J 11/0079 |
| 2017/0366308 A1* | 12/2017 | Choi | H04L 1/1887 |
| 2019/0059091 A1* | 2/2019 | Tang | H04W 74/0808 |

FOREIGN PATENT DOCUMENTS

| | | |
|---|---|---|
| CN | 104023373 A | 9/2014 |
| CN | 104662817 A | 5/2015 |
| CN | 105493592 A | 4/2016 |
| WO | 2015191963 A1 | 12/2015 |
| WO | 2016022303 A1 | 2/2016 |
| WO | 2016120436 A1 | 8/2016 |

OTHER PUBLICATIONS

System Architecture for a Cellular Net\vork with Cooperative Mobile Relay Balaji Raghothaman, Gregory Sternberg, Saurian Kaur, Ravikumar Pragada, Tao Deng, Kimn V anganurn InterDigital Communications LLC, King of Prussia, Pennsylvania. 19406, USA, 2011 IEEE (Year: 2011).*

Maaref, A., and Cao, Y., "User Cooperation for 5G Radio Access Networks", International Journal Wireless Information Networks (IJWIN), Si on Emerging 5G Technologies, pp. 1-16, Sep. 2015.

Maaref, A., Ma, J., Salem, M., Baligh, H., and Zarifif, K., "Device-centric radio access virtualization for 5G networks", IEEE Globecom International Workshop on Emerging Technologies for 5G Wireless Cellular Networks, pp. 887-893, Austin, TX, pp. 1-7, Dec. 2014.

ETSI EN 301 893 V.1.7.1, Broadband Radio Access Networks (BRAN); 5GHz high peformance RLAN; Harmonized EN covering the essential requirements of article 3.2 of the R&TTE Directive, pp. 1-90, Jun. 2012.

Ericsson,"On Procedures for In/Out of NW coverage detection for D2D",3GPP TSG RAN WG1 Meeting #76 R1-140780,Prague, Cz Rep., Feb. 10-14, 2013,total 5 pages.

Intel Corporation,"Resource allocation for D2D communication",3GPP TSG RAN WG2 Meeting #85 R2-140312, Prague, Czech Republic, Feb. 10-14, 2014,total 5 pages.

Huawei et al.,"Support for UE Cooperation in NR",3GPP TSG RAN WG1 Meeting #85 R1-164379, Nanjing, China, May 23-27, 2016, total 7 pages.

* cited by examiner (a) In-coverage TUE (b) Out-of-coverage TUE

Localized subcarrier mapping

LICENSED-ASSISTED USER EQUIPMENT COOPERATION IN UNLICENSED SIDELINK

FIELD

The application relates to systems and methods of licensed-assisted user equipment cooperation in unlicensed sidelinks.

BACKGROUND

In a radio access network, a network may form a logical/virtual user equipment (UE) mesh entity, hereinafter VUE, consisting of a group/cluster of UEs in close proximity, capable of sidelink device-to-device (D2D) short-range communications, to help boost coverage and spectral efficiency. UEs form a VUE that acts as a single distributed virtual transceiver with respect to the network. The network communicates with the distributed virtual transceiver through a first access link air interface designed for uplink and/or downlink communications.

A VUE consists of at least one target UE (TUE) surrounded by a set of cooperating UEs (CUEs). CUEs help TUEs communicate with the network, for example by receiving data on the downlink and/or transmitting data on the uplink using the access link air interface by acting as UE relays between the network and the TUEs.

SUMMARY

One aspect of the present disclosure provides a method for wireless communication. In the method, a first user equipment (UE) receives a multicast signal from a wireless network over a first spectrum band, the multicast signal comprising downlink information targeted to a second UE. The first UE performs in a contention procedure for a transmission opportunity (TXOP) in a second spectrum band in accordance with group listen-before-talk (LBT) parameters configured for a cluster of UEs that includes at least the first UE and the second UE. If the contention procedure has acquired a TXOP in the second spectrum band for the cluster, the first UE sends at least a portion of the downlink information to the second UE over the second spectrum band during the TXOP. In some embodiments, the first spectrum band is a licensed spectrum band and the second spectrum band is an unlicensed spectrum band.

In some embodiments, the first UE receives the multicast signal over the first spectrum band using a unified air interface and send the at least a portion of the downlink information to the second UE over the second spectrum band using the unified air interface. In other embodiments, the first UE receives the multicast signal over the first spectrum band using a first air interface and sends the at least a portion of the downlink information over the second spectrum band using a second air interface.

The first UE may receive transmission control information for the second spectrum band from the wireless network, the second UE, or another UE in the group. The first UE may then send the at least a portion of the downlink information to the second UE over the second spectrum band in accordance with the transmission control information. In some embodiments, the transmission control information indicates a respective offset assigned to the first UE in an interleaved frequency division multiple access (I-FDMA) resource grid in the second spectrum band. In such cases, the first UE may send the at least a portion of the downlink information to the second UE over the second spectrum band in accordance with the respective offset assigned to the first UE.

In some embodiments, the first UE autonomously selects transmission control information for the second spectrum band and sends the at least a portion of the downlink information to the second UE over the second spectrum band in accordance with the autonomously selected transmission control information. For example, the first UE may autonomously select an offset in an interleaved frequency division multiple access (I-FDMA) resource grid and send the at least a portion of the downlink information to the second UE over the second spectrum band by transmitting a signal from the first UE with an I-FDMA waveform in accordance with the autonomously selected offset.

In some embodiments, the first UE receives the group LBT parameters from the wireless network over the first spectrum band.

In some embodiments, the first UE performs in a contention procedure for a TXOP in the second spectrum band by performing a LBT procedure as a cluster leader UE (LUE) on behalf of the cluster in accordance with the group LBT parameters configured for the cluster. In such embodiments, the first UE may send time-frequency synchronization information to the cluster over the second spectrum band. The first UE may send resource control information to the cluster of UEs over the second spectrum band, the resource control information indicating an allocation of transmission resources within the second spectrum band to the UEs of the cluster.

In some embodiments, the first UE performs in a contention procedure for a TXOP in the second spectrum band by performing in a group LBT procedure synchronously with other UEs of the cluster in accordance with the group LBT parameters configured for the cluster. In such embodiments, the first UE may perform a frame-based equipment (FBE) LBT procedure or a load-based equipment (LBE) LBT procedure synchronously with other UEs of the cluster.

In some embodiments, the first UE receives a time-frequency synchronization signal from the second UE over the second spectrum band. In such embodiments, the first UE may use the time-frequency synchronization signal to perform a channel estimation in the second spectrum band, to decode a control channel in the second spectrum band and/or the first UE may use the time-frequency synchronization signal as a timing reference to send the at least a portion of the downlink information to the second UE over the second spectrum band during the TXOP acquired for the cluster.

In some embodiments, the first UE receives resource control information from the wireless network over the first spectrum band, the resource control information indicating an allocation of transmission resources within the second spectrum band to the UEs of the cluster. The first UE then sends the at least a portion of the downlink information to the second UE over the second spectrum band in accordance with the resource control information.

The first UE may detect the downlink information in the received multicast signal using a group identifier (ID) associated with the cluster. The first UE may also send the at least a portion of the downlink information to the second UE by multicasting the at least a portion of the downlink information to the cluster over the second spectrum band using the group ID.

In some embodiments, the first UE receives time-frequency synchronization information from the wireless network over the first spectrum band and uses the time-frequency synchronization information to synchronize communication within the cluster over the second spectrum band.

If the first UE receives a negative acknowledgement (NACK) from the second UE over the second spectrum band, the first UE may perform the contention procedure again for another TXOP in the second spectrum band in accordance with the group LBT parameters. If the contention procedure has acquired another TXOP in the second spectrum band for the cluster, the first UE may then re-send the at least a portion of the downlink information to the second UE over the second spectrum band during the another TXOP acquired for the cluster.

In some embodiments, the first UE receives a group LBT synchronization time or boundary from the wireless network or from a target UE or from a leader UE.

Another aspect of the present disclosure provides a user equipment (UE) device configured to perform the method according to the above aspect of the present disclosure. For example, such a UE device may include a wireless interface, a processor operatively coupled to the wireless interface, and a computer readable storage medium operatively coupled to the processor, the computer readable storage medium storing instructions for execution by the processor that include instructions to perform the method according to the above aspect of the present disclosure.

Yet another aspect of the present disclosure provides another method for wireless communication. In this method, a network device sends, to a cluster of UEs over a first spectrum band, information regarding group listen-before-talk (LBT) parameters for the cluster of UEs to use in a contention procedure for a transmission opportunity (TXOP) in a second spectrum band. In some embodiments, the first spectrum band is a licensed spectrum band and the second spectrum band is an unlicensed spectrum band. The network device may send to the cluster of UEs over the first spectrum band, information regarding transmission scheduling for the cluster of UEs in the second spectrum band. The information regarding transmission scheduling for the cluster of UEs in the second spectrum band may include information indicating, for each of at least one of the UEs in the cluster, a respective offset assigned to the UE in an interleaved frequency division multiple access (I-FDMA) resource grid in the second spectrum band, for example. The information regarding group listen-before-talk (LBT) parameters may include information regarding group LBT parameters for a frame-based equipment (FBE) LBT procedure or information regarding group LBT parameters for a load-based equipment (LBE) LBT procedure, for example.

In some embodiments, the network device sends resource control information to the cluster of UEs over the first spectrum band, the resource control information indicating an allocation of transmission resources within the second spectrum band to the UEs of the cluster.

In some embodiments, the network device sends the information regarding group listen-before-talk (LBT) parameters for the cluster to use in the second spectrum band over a control channel in the first spectrum band. In some cases the network device may send the information over the control channel using a group identifier (ID) associated with the cluster.

In some embodiments, the network device sends a multicast signal to the cluster of UEs over the first spectrum band, the multicast signal containing downlink information targeted to at least one of the UEs of the cluster.

Still another broad aspect of the present invention provides a network device configured to perform the method according to the above aspect of the present disclosure. For example, such a network device may include a wireless interface, a processor operatively coupled to the wireless interface, and a computer readable storage medium operatively coupled to the processor, the computer readable storage medium storing instructions for execution by the processor that include instructions to perform the method according to the above aspect of the present disclosure.

DETAILED DESCRIPTION

Figure 1:
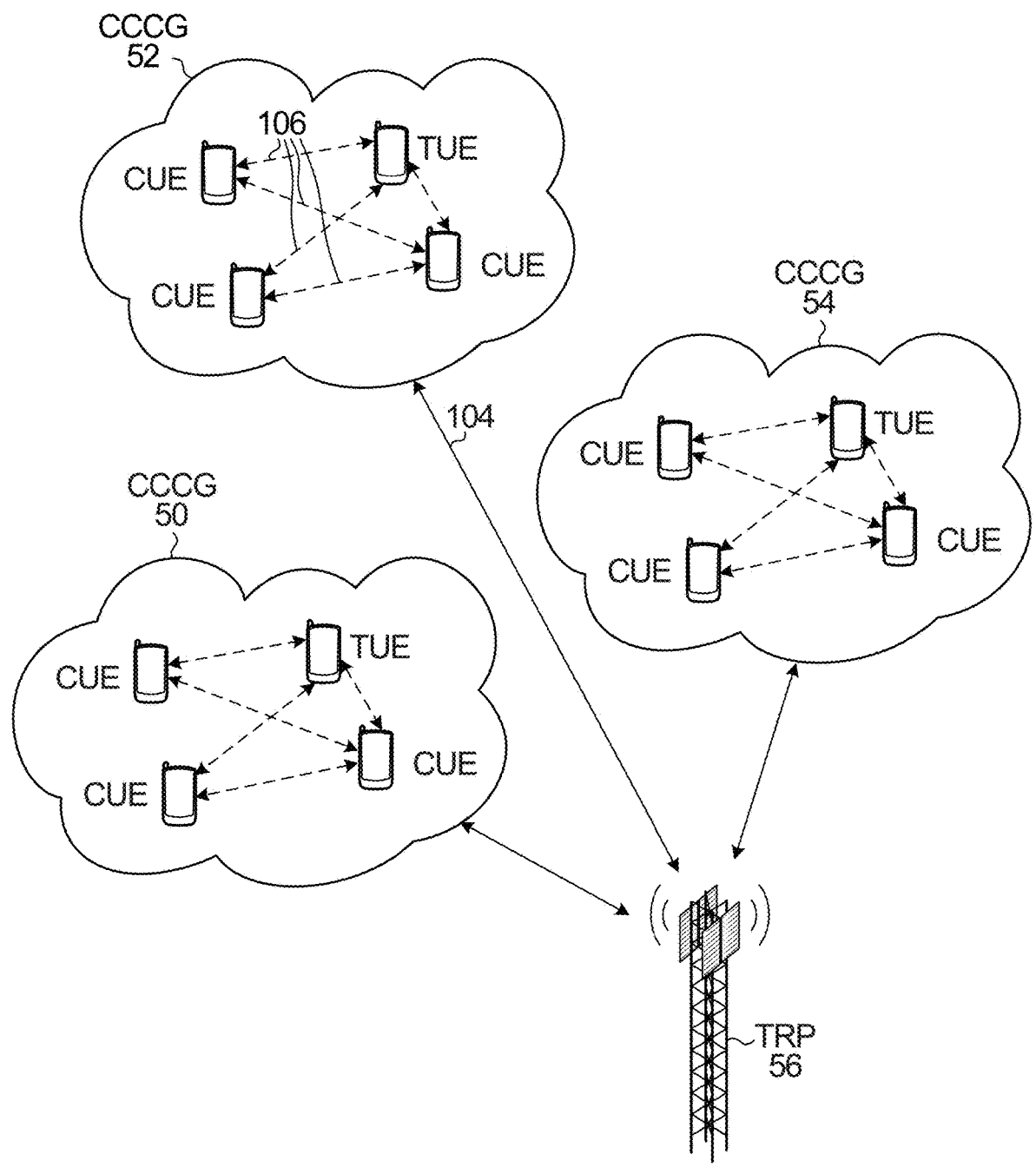
FIG. 1 is a block diagram of a network containing coordinated contention cooperation groups (CCCGs)

Generally, embodiments of the present disclosure provide a method and system for cooperative UE operation in an integrated spectrum environment. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

When a D2D communication among the UEs of a VUE takes place in the unlicensed spectrum, each individual UE performs a listen-before talk (LBT) operation (for example including initial clear channel assessment (ICCA) or extended clear channel assessment (ECCA)) before accessing the unlicensed spectrum in order to check that the channel is idle before transmitting.

If every individual UE in a VUE accessed the unlicensed spectrum individually, it would create delay and would deteriorate UE cooperation performance at least in terms of the delay for all individual devices to perform their own LBT operation. If CUEs perform independent LBT procedures, they may either start forwarding data or send a reservation signal to ensure that other devices do not occupy the channel before they are able to transmit. In both situations, if no coordination exists between CUEs in terms of aligning their CCA periods, sending of the reservation signals or starting of the data forwarding to the TUEs, then the channel may appear to be busy for the other CUEs within the group, which in turn will increase the latency of UE cooperation.

When one UE occupies the channel first (i.e. after performing LBT), the other UEs which are in close proximity will see the channel as busy. If the channel is found to be busy after an initial CCA, a UE may have to go through extended CCA periods due to the use of random backoff counters.

Systems and methods for D2D-enabled licensed-assisted UE cooperation in unlicensed sidelinks are provided that may mitigate one or more of the disadvantages of the approach described above. In some embodiments, UEs in the same CG synchronize their LBT procedure in order to be able to access the unlicensed band simultaneously and not take turns to transmit. Such synchronized group LBT may decrease the channel access delay and also achieve spatial frequency multiplexing. Reducing sidelink latency is very important for UE cooperation because CUEs need to keep forwarding data received from the network towards TUEs.

In some embodiments, TUEs are configured to work in full-buffer mode, that is, they are receiving data from the network every single transmission time unit. The CUEs are configured to not take more than one access link transmission time unit (TTU) when forwarding data towards TUEs including any Hybrid Automatic Repeat reQuest (HARQ) retransmissions.

FIG. 1 depicts an example of how UEs in close proximity can be grouped into coordinated contention cooperation groups (CCCGs) that behave as distributed transceivers, and perform coordinated contention procedures with respect to the network, in accordance with an embodiment of the invention. A CCCG may, for example, be a UE mesh, a VUE, or a coordinated multi-point (CoMP), configured to perform coordinated contention as described herein.

Shown are three CCCGs 50,52,54 and a network transmission reception point (TRP) 56. Each CCCG includes at least one CUE that performs coordinated contention as part of the CCCG, in accordance with an embodiment of the invention, and one target UE TUE. TUEs are the intended destinations of the signals transmitted from a TRP towards a CCCG. CUEs help TUEs in communicating with the network using D2D sidelinks for short-range communications within the corresponding CCCG. In doing so, CUEs effectively act as UE-to-Network relays towards the TUEs. CUEs may be selected from the set of active or idle devices within the neighborhood of the TUEs provided they are willing to cooperate (e.g. in exchange for some incentive). Alternatively, the CUEs may be operator-aware terminals, strategically deployed by subscribers (end-users) or operators for the sole purpose of UE cooperation.

Focusing on the downlink illustrated in FIG. 1, group-based UE cooperation involves two phases:

Network Multicast Phase: The network multicasts a data packet to a CCCG. Depending on the cooperation scenario and strategy, both TUEs and CUEs can attempt to decode the packet during this phase.

UE Cooperation Phase: CUEs forward cooperation information to the TUEs to help them decode the packet received during the multicast phase. Information sent by CUEs during the cooperation phase depends on the cooperation strategy, e.g. amplify-and-forward (AF), decode-and-forward (DF), compress-and-forward (CF), (frequency-selective) soft-forwarding (SF), joint reception (JR). The UE cooperation phase includes a cooperative contention procedure as detailed below.

Figure 2:
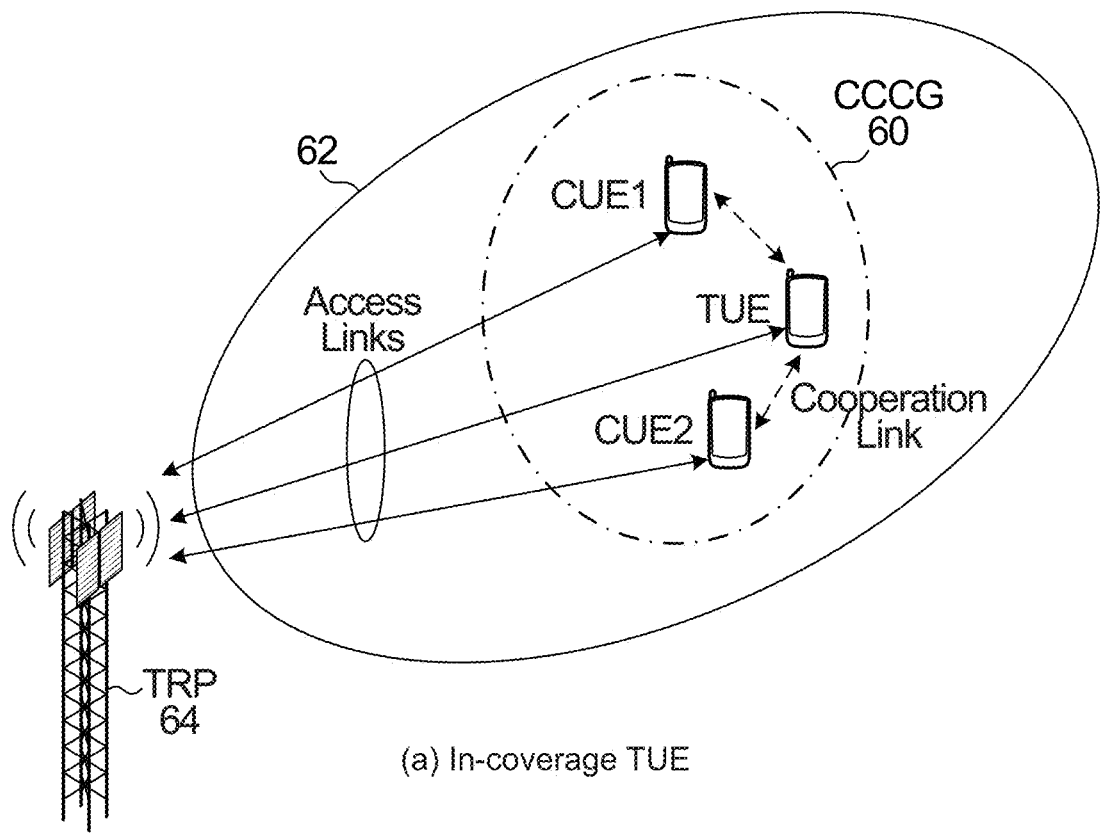
FIG. 2 is a block diagram showing an in-coverage TUE and an out-of-coverage TUE.
Figure 2:
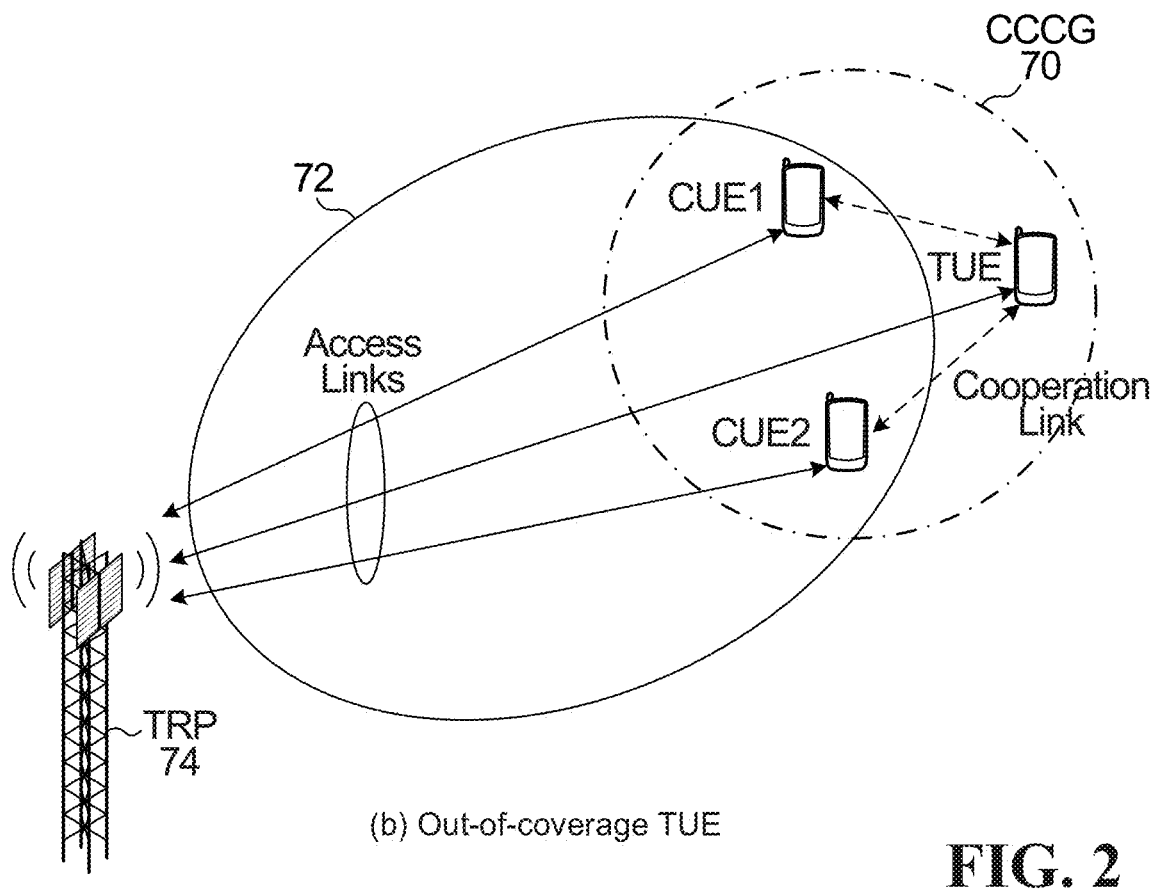

A TUE may be within network coverage or outside coverage. An example of these scenarios is depicted in FIG. 2. In scenario (a), the TUE 60 is within the coverage area 62 of a TRP 64, whereas in scenario (b), the TUE 70 is not within the coverage area 72 of TRP 74. Depending on whether a TUE is within network coverage (FIG. 2, scenario (a)) or outside network coverage (FIG. 2, scenario (b)), the TUE may combine the information received from TRPs during multicast phase and/or CUEs during the cooperation phase, in order to decode the original packet transmission. For the in-coverage scenario, all signaling between the TRP and TUE can be conveyed through the direct access link between TRP and TUE, whereas for the out-of-coverage case such signaling will have to be conveyed through CUEs.

Referring back to FIG. 1, the individual UEs forming the CCCG use a first air interface designed for an access link (uplink/downlink) to communicate with the network over the first licensed spectrum band, and use a second air interface designed for sidelink communications for D2D mutual broadcast over an unlicensed spectrum band.

The CCCG 52, for example, communicates with the network over a licensed band as indicated at 104. Sidelink communications within the CCCG 52 take place over an unlicensed band, as indicated at 106. The CCCG 52 synchronously accesses the unlicensed band in accordance with configured timing and LBT parameters as a single virtual entity for D2D device mesh mutual broadcast within the CCCG, for example by performing a synchronized group LBT procedure in unlicensed spectrum to contend for a transmission opportunity (TXOP). The access link and sidelink air interfaces may use the same radio access technology (RAT) such as LTE or 5G NR or they may use distinct RATs e.g. the access link air interface may belong to 5G NR and the sidelink air interface may belong to LTE and vice versa. In another embodiment, the access link air interface may belong to LTE or 5G NR and the second air interface may belong to WiFi. In another embodiment, the access link and sidelink air interfaces have designs that are similar, harmonized and/or unified. Specifically, in some embodiments the UE is configured with an air interface that handles uplink, downlink and sidelink communications using licensed and unlicensed spectrum in a unified way.

Because the CCCG contends for unlicensed spectrum transmission opportunities as a single virtual entity, the delays due to individual UEs taking turns to perform separate LBT procedures can be avoided or mitigated. In addition, synchronized group LBT procedures in the unlicensed spectrum may lead to a reduced delay and efficient D2D transmissions within the CCCG while conforming to fair spectrum access regulations in the unlicensed spectrum.

In some embodiments, control signals received over the licensed spectrum during the multicast phase are used to help with synchronization, group LBT and group scheduling during acquired transmission opportunities. The CCCG receives the control and synchronization information from the network during the multicast phase.

In some embodiments, a group ID is used by the CCCG to communicate with the network using the access link air interface over the licensed spectrum and to communicate using the second air interface for D2D mutual broadcast over an unlicensed spectrum band. The group ID is used to scramble the control information multicast to the CCCG so that every individual UE can read the control information and therefore know how to decode the data message. Once every UE has tried to decode, they will forward some information to the TUEs during the cooperation phase. The information forwarded by CUEs can be the same or different and helps the TUE receive the information intended for the TUE. The group ID works similarly to how an individual UE identifier would for an individual UE. The network sees the CCCG as if it was a single UE with that identifier.

Figures 3A, 3B:
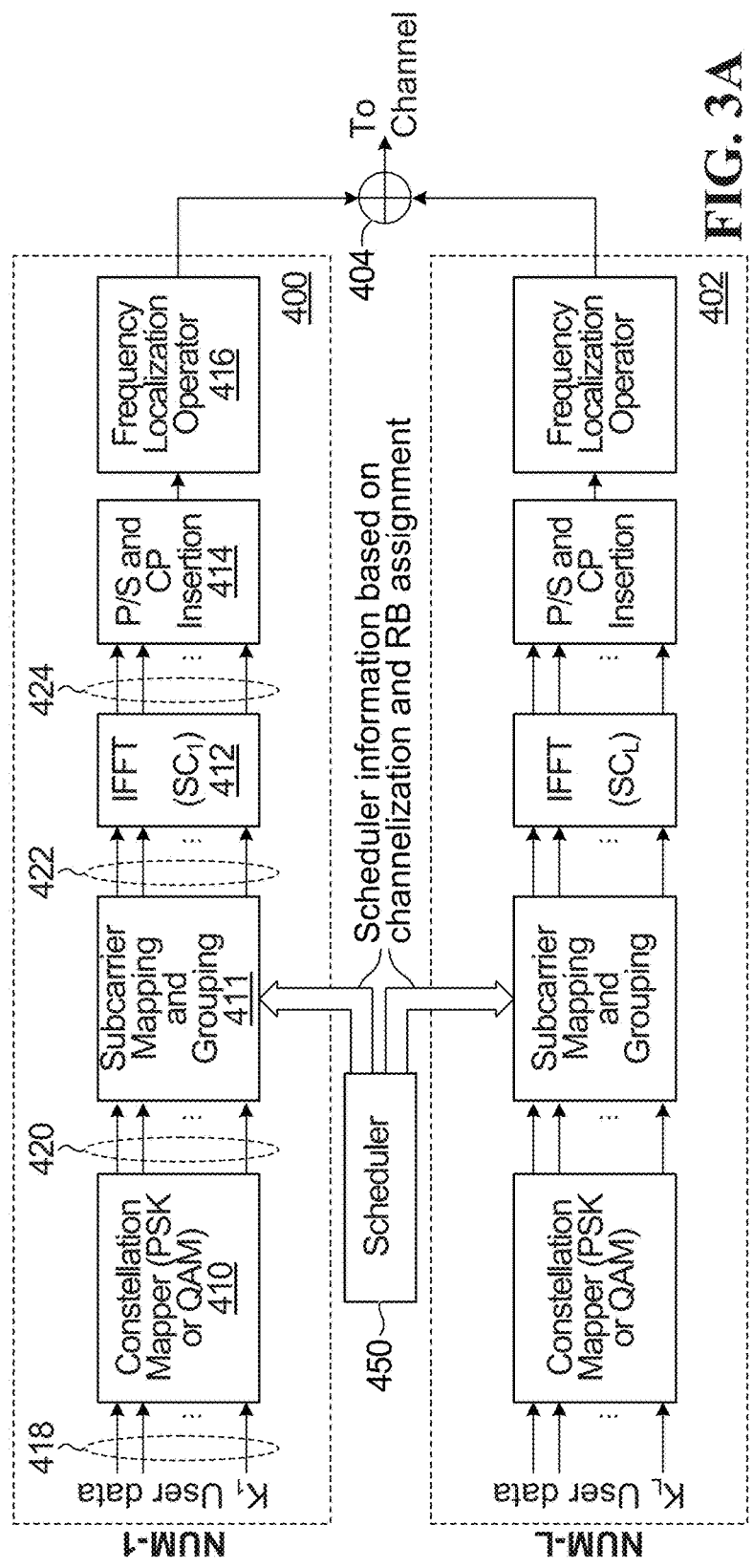
FIG. 3A is a block diagram of a transmit chain of a TRP for serving a CCCG in accordance with an embodiment of the invention.
FIG. 3B is a block diagram of a receive chain of a TRP in accordance with an embodiment of the invention.

Referring now to FIG. 3A, shown is an example simplified block diagram of part of a transmit chain that can be used to perform the network side functionality transmit of the methods described herein. The transmitter might be implemented in a TRP, for example. In this example, there are L supported numerologies, where L>=2, each numerology operating over a respective sub-band with a respective sub-carrier spacing. However, this approach can be applied when there is only a single numerology.

For each numerology, there is a respective transmit chain 400,402. FIG. 3A shows simplified functionality for the first and Lth numerology; the functionality for other numerologies would be similar. Also shown in FIG. 8B is simplified functionality for a receive chain 403 for a receiver operating using the first numerology.

The transmit chain 400 for the first numerology includes a constellation mapper 410, subcarrier mapping and grouping block 411, IFFT 412 with subcarrier spacing $SC_1$, pilot symbol and cyclic prefix insertion 414, and frequency localization operator 416 (for example filtering, sub-band filtering, windowing, sub-band windowing). Also shown is a scheduler 400 that performs scheduling.

In operation, constellation mapper 410 receives UE data (more generally, UE content containing data and/or signalling) for $K_1$ UEs, where $K_1$>=1. The constellation mapper 410 maps the UE data for each of the $K_1$ UEs to a respective stream of constellation symbols and outputs this at 420. The number of UE bits per symbol depends on the particular constellation employed by the constellation mapper 410. In the example of quadrature amplitude modulation (QAM), 2 bits from for each UE are mapped to a respective QAM symbol.

For each OFDM symbol period, the subcarrier mapping and grouping block 411 groups and maps the constellation symbols produced by the constellation mapper 410 to up to P inputs of the IFFT 412 at 422. The grouping and mapping is performed based on scheduler information, which in turn is based on channelization and resource block assignment, in accordance with a defined resource block definition and allocation for the content of the $K_1$ UEs being processed in transmit chain 400. P is the size of the IFFT 412. Not all of the P inputs are necessarily used for each OFDM symbol period. The IFFT 412 receives up to P symbols, and outputs P time domain samples at 424. Following this, in some implementations, time domain pilot symbols are inserted and a cyclic prefix is added in block 414. The frequency localization operator 416 may, for example, apply a filter $f_1(n)$ which limits the spectrum at the output of the transmit chain 400 to prevent interference with the outputs of other transmit chains such as transmit chain 402. The frequency localization operator 416 also performs shifting of each sub-band to its assigned frequency location.

The functionality of the other transmit chains, such as transmit chain 402 is similar. The outputs of all of the transmit chains are combined in a combiner 404 before transmission on the channel. Typically, the transmitter would include other functionality, such as an RF transmitter functionality, not shown.

The subcarrier mapping and grouping block 411 of FIG. 3A groups and maps the constellation symbols based on the resource block definition(s) and scheduling. The scheduler 450 of FIG. 3A decides where in time and frequency the UE's resource blocks will be transmitted.

FIG. 3B shows a simplified block diagram of a receive chain for the TLP operating with the first numerology depicted at 403. A corresponding receive chain is included for each numerology supported on the uplink. The receive chain 403 includes frequency localization operator 430, cyclic prefix deletion and pilot symbol processing 432, fast Fourier transform (FFT) 434, subcarrier de-mapping 436 and equalizer 438. Each element in the receive chain performs corresponding reverse operations to those performed in the transmit chain. The receive chain for a operating with another numerology would be similar. The receiver would include other functionality, such as inverse fast Fourier transform (IFFT) block, RF receiver functionality, not shown.

From a CUE perspective, the transmitter and receiver functionality is similar to that of FIGS. 3A and 3B, except that in some embodiments, there is only be one transmit chain and receive chain for communicating with the network, and there would not be a scheduler; rather, scheduling information would be received from the network. Alternatively, CUEs may operate in a grant-free mode. In some embodiments, CUEs can also receive scheduling information from a TUE or LUE (leader UE, discussed below). In addition, in some embodiments, there is a second transmit chain and receive chain for transmitting and receiving D2D communications on the second air interface, e.g. the unlicensed band. The second transmit and receive chain may be similar to the transmit chain and receive chain for transmitting to the network, if the two air interfaces are similar, but alternatively it may be completely different.

In some CUEs, the same transmit/receive chain is used in communicating both with the network and over the sidelink. The transmit and receive chains may be similar to those of FIGS. 3A and 3B.

In addition, in some embodiments, a CUE is configured to be capable of handling multiple numerologies, e.g. one numerology for a licensed band and one numerology for an unlicensed band. A UE may also use different transmit/receive chains for the uplink, downlink or sidelink. A UE may have different transmit/receive chains if the air interfaces on the network link and sidelink have different characteristics. This may be the case even within a single RAT and even if the same band is used for the network link and sidelink. In some embodiments, a CUE has different transmit chains associated with different RATs e.g. LTE/NR TX chain and WiFi TX chain.

In some embodiments, the same RAT is employed for both network and sidelink communications, in licensed and unlicensed bands respectively. In some embodiments, this involves using different air interfaces of the same RAT for network and sidelink communications. In some cases, the transmit or receive chain is RAT specific and can accommodate different air interfaces for the sidelink and network link.

In some embodiments, LTE/NR (new radio) is used for the network link and WiFi or WiFi-direct is used to carry out the UE cooperation phase communications in an unlicensed band.

CCCG Operation

Figure 4:
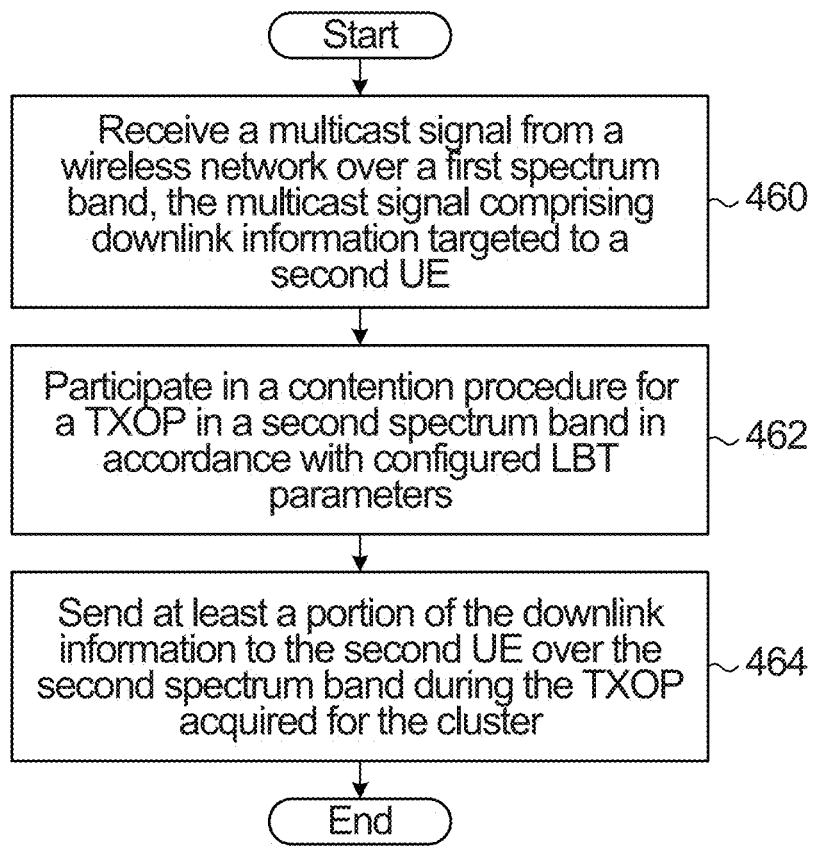
FIG. 4 is a flowchart of a method of CCCG operation in accordance with an embodiment of the invention.

A three-phase procedure for CCCG operation on the downlink is provided and will now be described with reference to FIG. 4.

In block 460, the CCCG receives a multicast signal from a wireless network (e.g. from one or more TRPs) over a first spectrum band. The multicast signal includes downlink information targeted to at least one target UE. This may, for example, involve receiving the multicast signal over a first air interface over a first licensed spectrum band. In block 462, the CCCG contends for a TXOP in a second spectrum band in accordance with configured LBT parameters. For example, this may involve contending for a TXOP in unlicensed spectrum using a synchronized group LBT procedure. At least one CUE in the CCCG performs the contention procedure. Various examples of this step are described below. In block 464, at least a portion of the downlink information is sent to the target UE over the second spectrum band during the TXOP acquired for the CCCG. For example, a sidelink air interface may be used by the CCCG for mutual broadcast over the unlicensed spectrum during the acquired TXOP.

Block 462 involves contention for unlicensed spectrum access. In some embodiments, the network is aware of the CCCG and can assist with CCCG formation. In some such embodiments, the network through one of its transmission points (TPs) contends for the TXOP on behalf of the CCCG. For example, a TP may perform a Category 4 LBT (LBT with random backoff or ECCA). The CUEs then only need to perform a short LBT (LBT without random backoff, i.e. with only ICCA), such as a Category 2 LBT, in order to access the unlicensed band during the acquired TXOP.

In some embodiments, the CCCG selects a cluster leader UE (LUE) that contends for the TXOP on behalf of the group, i.e., performs a Category 4 LBT in order to acquire the TXOP on behalf of the UE group, and can take charge of synchronization within the CCCG as well as resource scheduling during for block 462. The LUE can be the TUE or any CUE in the group.

In some embodiments, the CCCG performs contention using a synchronized group LBT procedure. With LBT channel access, the latency between the reception of a multicast packet from the network (for example from an eNodeB (eNB) or TRP) and the forwarding by the CUEs within a given CCCG can be variable. In some embodiments, one of two LBT modes/implementations for accessing the unlicensed spectrum is employed. One of the modes involves the CCCG operating as a virtual frame-based equipment (FBE), and the other mode involves the CCCG operating as a load-based equipment (LBE) to perform synchronized group LBT. The network can assist synchronization for the group LBT procedure preceding the cooperation phase using control channels over the licensed band during the multicast phase. For example, parameters necessary to synchronize LBT procedure by the CUEs can be configured by the network or the LUE, such as random backoff counter value (N) for ECCA and backoff window size [1,q] where q is a value to be chosen in [4, . . . , 8, . . . , 32]. Note that the value of q in LBE channel access also determines the value of the maximum channel occupancy time (MCOT) or maximum TXOP duration as q*13/32 ms.

FBE allows for relatively simple group synchronization, but is less spectrally efficient than LBE. On the other hand, LBE requires CUEs within the CCCG to coordinate their access parameters CCA duration, defer time and random backoff parameter), reservation signal sending and start time of data forwarding. With LBE, CUEs within the same CCCG should be configured with the same LBT parameters for a given carrier. This can be done using the licensed spectrum control channel via the group ID. Even after coordinating their LBE parameters, CUEs may not be able to transmit at the same time due to varying interference conditions which can be experienced by CUEs.

Group LBT synchronization among CUEs can also be performed across multiple unlicensed spectrum bands. For example, CUEs need not forward data to the TUE using the same carrier. In this case, CUEs are not competing with each other to access the unlicensed band. However, it can still be useful for them to synchronize their LBT procedure which could facilitate the decoding at the TUEs.

Figure 5A:
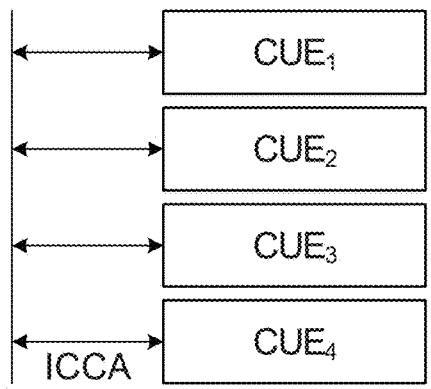
FIG. 5A is a first example of access parameter coordination.

Other LBT synchronization procedures are also possible among CUEs such as performing independent LBT procedures that are initially independent with random backoff (e.g. Category 4 LBT) or without random backoff (e.g. Category 2 LBT), and then self-deferring the start of their transmissions until a properly chosen synchronization boundary (time), which can be configured by the network through TRP or LUE, in order to wait for some CUEs that might be experiencing different interference conditions to complete their random backoff countdown or extended CCA. At the LBT synchronization boundary time, CUEs can start another round of LBT, with the initial CCA. Note that depending on the results of the ICCA, some CUEs may still not be able to transmit if they find the medium to be busy after the ICCA. FIG. 5A depicts an example of synchronized clear channel assessment (CCA) for CUEs in the CCCG when the CUEs access the unlicensed bands according to the FBE mode such as LBT Category 2.

Figure 5B:
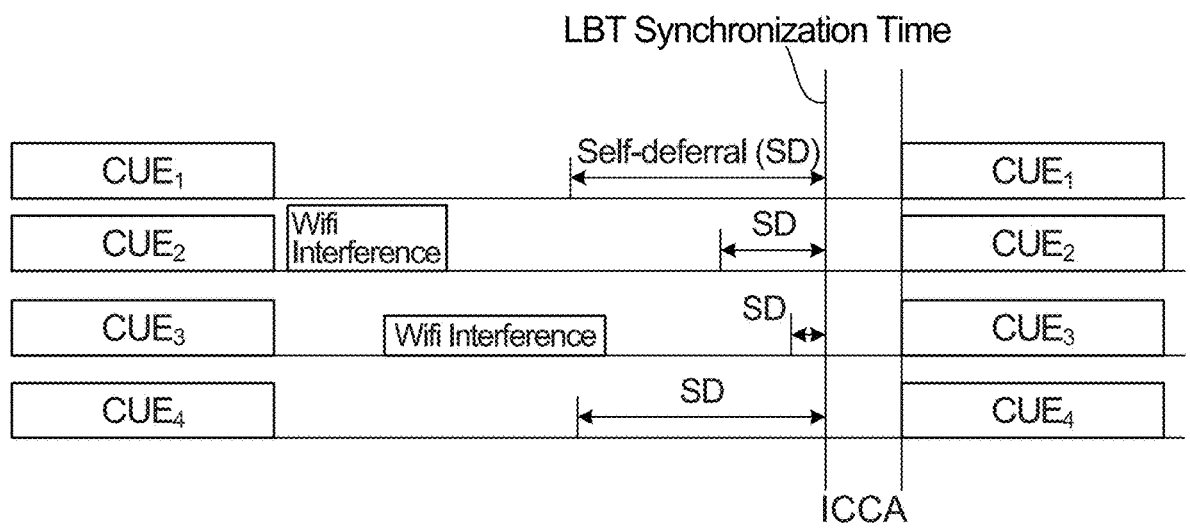
FIG. 5B is a second example of access parameter coordination.

FIG. 5B shows an example of CUEs that access the unlicensed band according to the LBE mode such as LBT category 4 with both ICCA and ECCA. CUEs align their ICCA by virtue of self-deferral. CUE 1 and CUE 4 perform longer self-deferral in order to align their transmissions with CUE 2 and CUE 3, which experience WiFi interference of variable duration. The LBT synchronization boundary can be configured by the network in the licensed band during the multicast phase. Therefore, no further dedicated control signaling is required in order to configure the LBT synchronization boundary/time.

Note that UEs forming the CCCGs synchronously transmit data during the D2D cooperation phase. This can be achieved by ensuring CCCGs act as a single entity when accessing the unlicensed spectrum and perform a group-LBT procedure, thus behaving for unlicensed spectrum access purposes like a single UE trying to access the unlicensed spectrum using any LTE/5G NR licensed-assisted access (LAA) LBT procedure (e.g. FBE or LBE). Several methods can be used to allow a CCCG to access the unlicensed spectrum as a single entity such as selecting a cluster-head/leader UE to coordinate a cluster unlicensed spectrum transmission opportunity (C-TXOP) or having the network through one of its serving TPs contend for a C-TXOP on behalf of the cluster. In both cases, synchronization and/or control information may be provided to the CCCG using the conventional downlink control channel during the multicast phase or communicated directly through the D2D sidelink control channel on the licensed/ unlicensed band.

Figure 6:
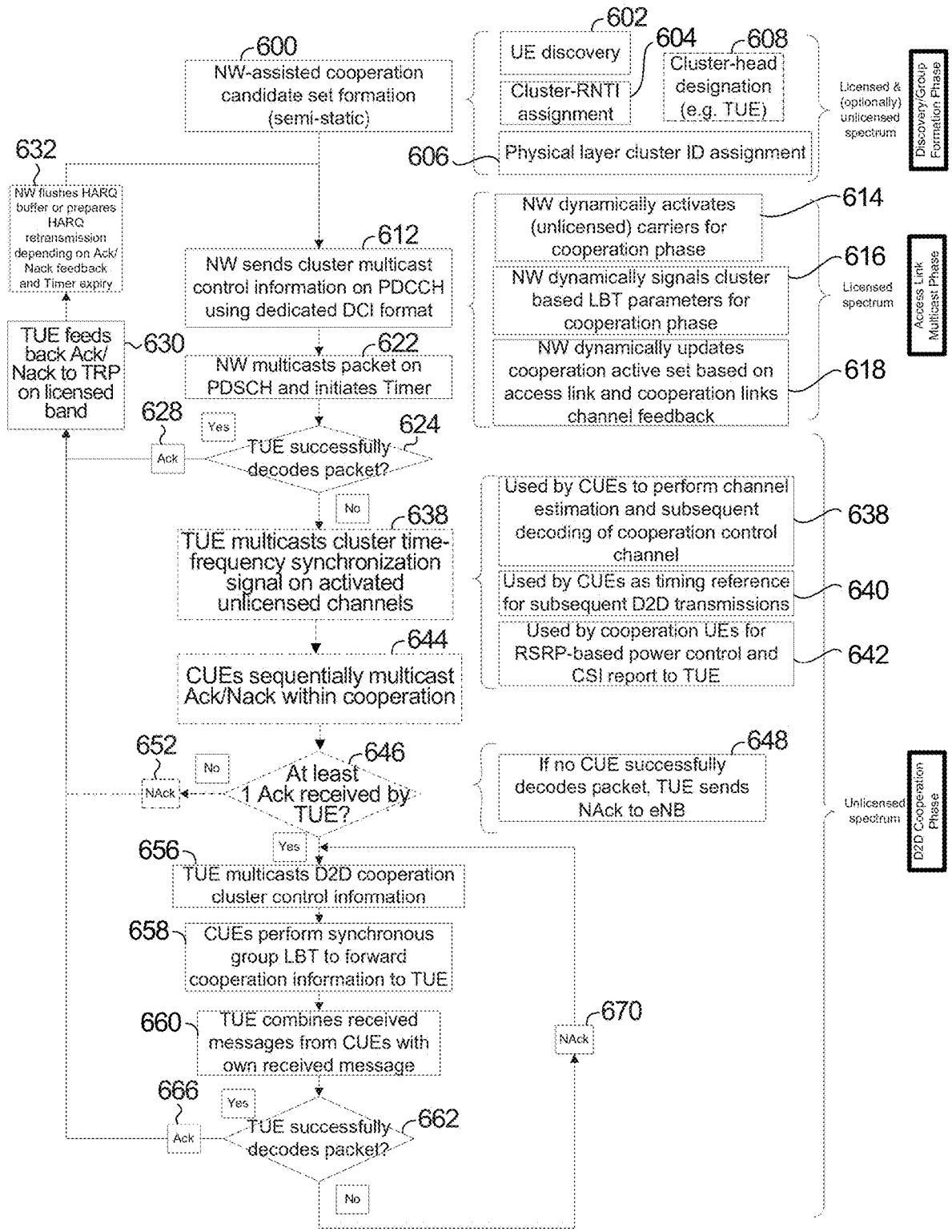
FIG. 6 is a flowchart of a method of delivering a delay-tolerant unicast transmission in accordance with an embodiment of the invention.
Figure 7:
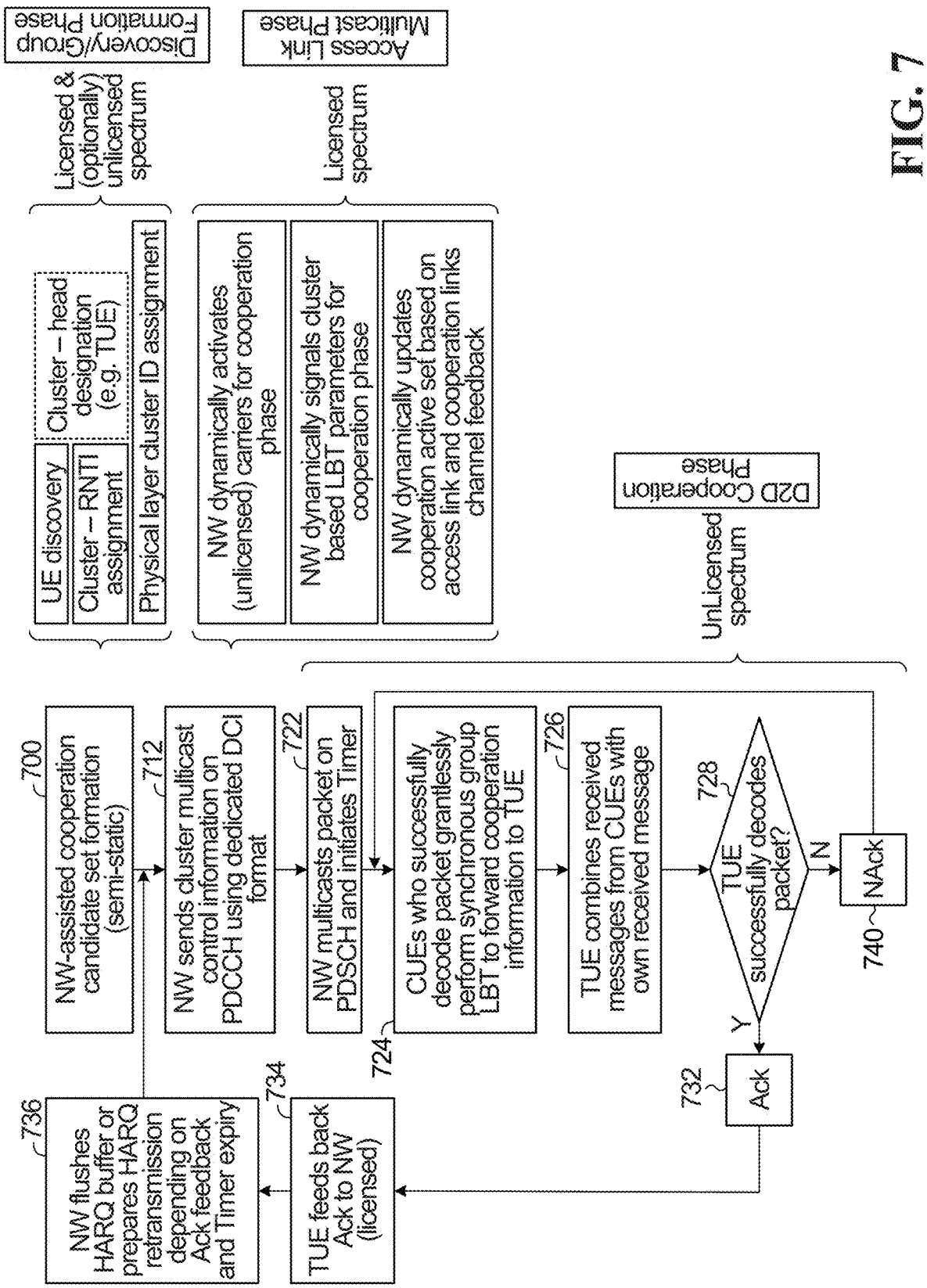
FIG. 7 is a flowchart of a method of delivering a delay-sensitive cooperative unicast transmission in accordance with an embodiment of the invention.
Figure 8:
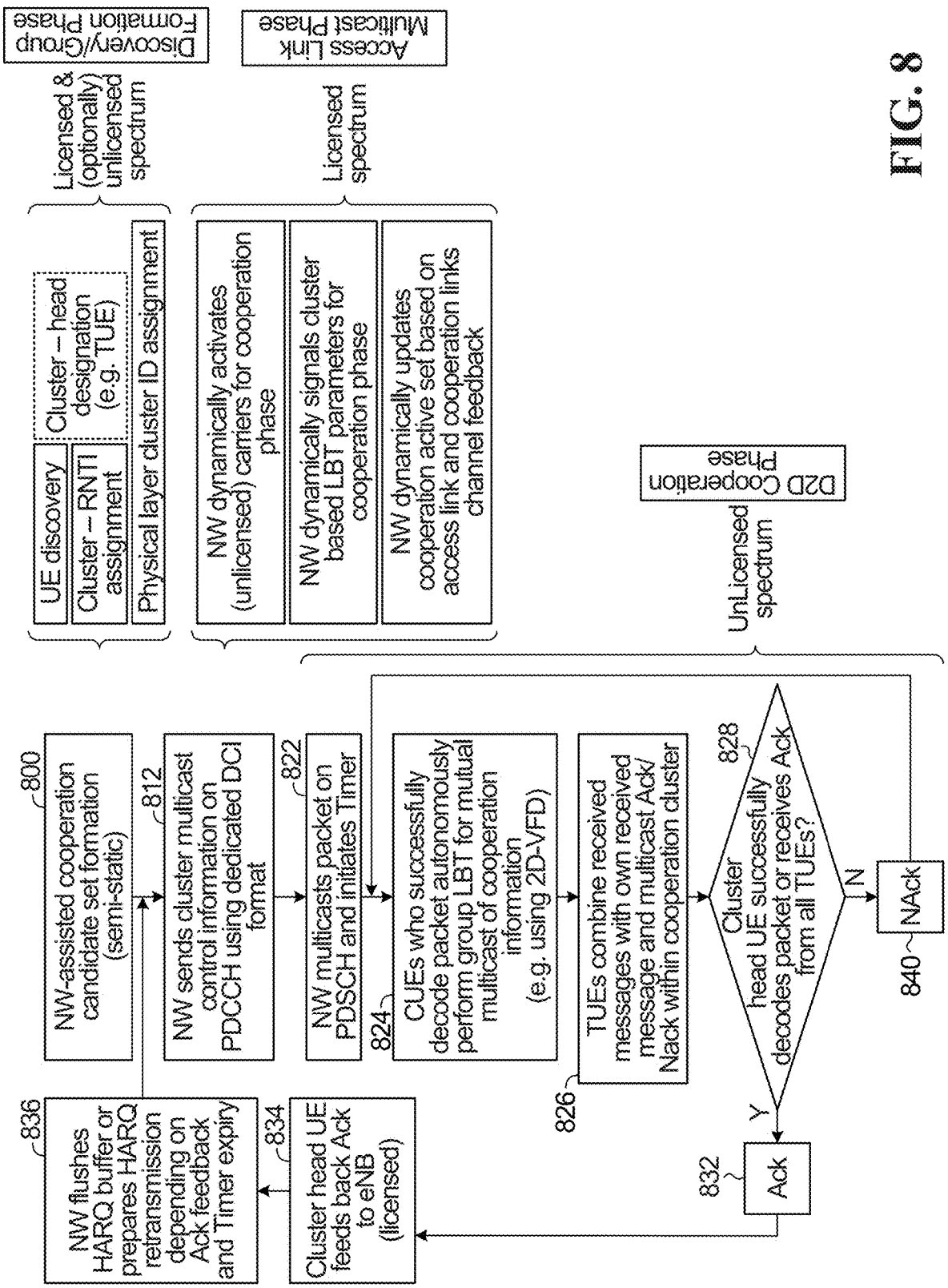
FIG. 8 is a flowchart of a method of delivering a cooperative multicast transmission in accordance with an embodiment of the invention.
Figure 13:
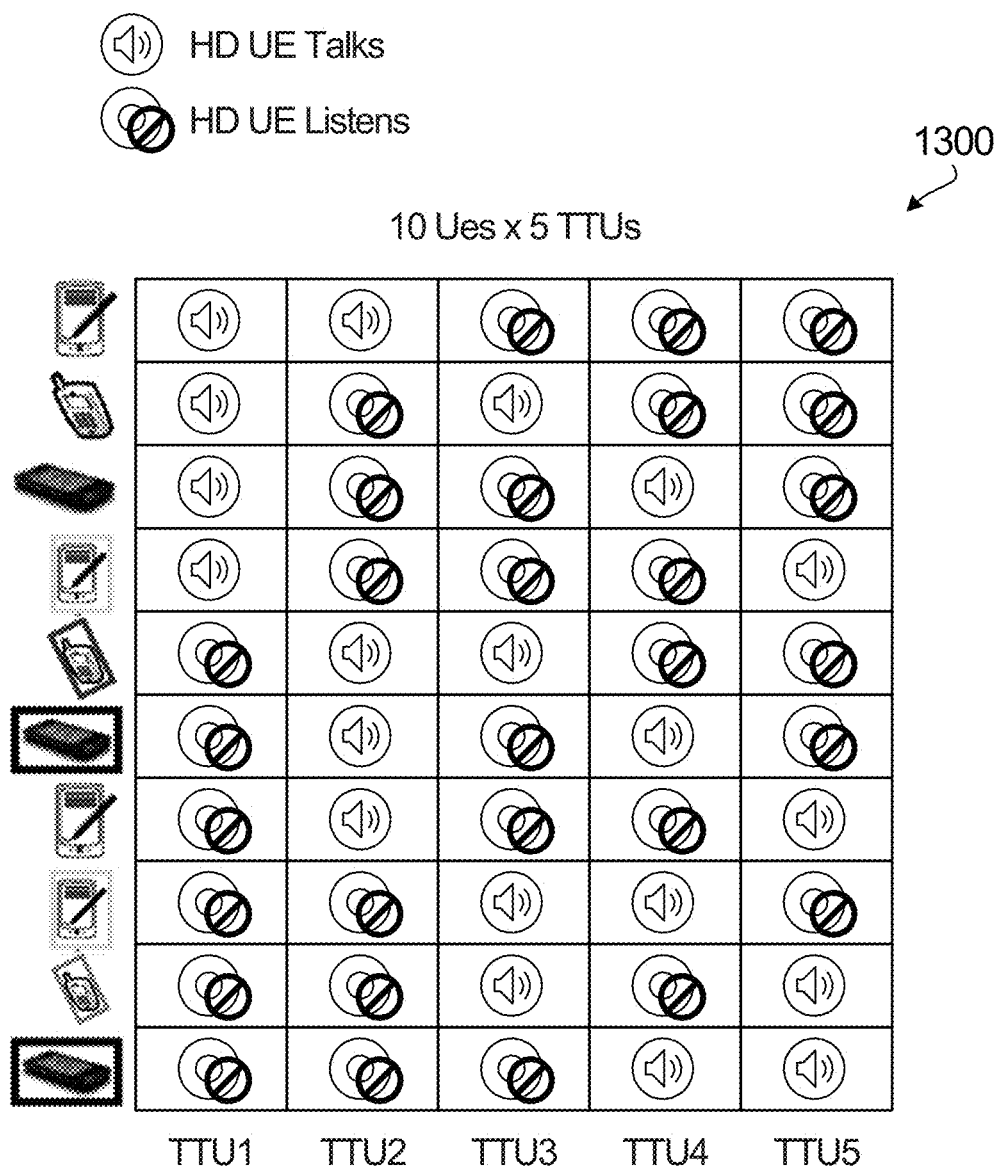
FIG. 13 depicts an example resource allocation for virtual full duplex capacity for cooperative mutual broadcast.

D2D transmissions during the cooperation phase can be scheduled (grant-based) or distributed (grant-free). Representative flowcharts corresponding to these two scenarios are illustrated in FIGS. 6 and 7, respectively. FIG. 8, on the other hand, illustrates a cooperative multicast scenario where there can be more than one TUE within the cluster all seeking to cooperatively communicate with the network. An example of a transmission scheme suitable for this cooperative UE structure is the two-dimensional virtual full-duplex (VFD) mutual broadcasting scheme described below with reference to FIG. 13.

FIG. 6 contains a flowchart of a method implementing a delay-tolerant cooperative unicast scenario. The method features a grant-based (scheduled) D2D cooperation phase, and a 2-level HARQ mechanism.

In block 600, network-assisted cooperation candidate set formation is performed. This may be done on a semi-static basis as illustrated. In a specific example, block 600 includes UE discovery at block 602, cluster-RNTI assignment at block 604, physical layer cluster ID assignment at block 606, and cluster-head designation, for example TUE, at block 608. In this example, block 600 is the Discovery/Group Formation Phase, which takes place on a licensed and optionally unlicensed spectrum band.

In block 612, the network sends cluster multicast control information on a control channel (in the illustrated example, this is a Physical Downlink Control Channel (PDCCH)) using dedicated Downlink Control Information (DCI) format. In a specific example, block 612 includes the network dynamically activating carriers for cooperation phase at block 614, the network dynamically signalling cluster-based LBT parameters for cooperation phase at block 616 and the network dynamically updating cooperation active set based on access link and cooperation links channel feedback at block 618. The carriers in block 614 are typically licensed.

In block 622, the network multicasts a packet on PDSCH and initiates a timer. In this example, blocks 612 and 622 together constitute an Access Link Multicast Phase that is performed on a licensed spectrum. The network co-ordinates the cluster-based LBT procedure by providing the parameters in block 616.

In block 624, the TUE determines whether the TUE has successfully decoded the packet multicast by the network in block 622. If TUE successfully decodes packet, then in block 628 an acknowledgement (Ack) is sent. Blocks 630, 632 which follow block 628 are described in detail further below.

If the TUE does not successfully decode the packet, then in block 636 the TUE multicasts a cluster time-frequency synchronization signal on activated unlicensed channels. In a specific example, block 636 is used by CUEs to perform channel estimation and subsequent decoding of cooperation control channel at block 638, is used by CUEs as timing reference for subsequent D2D transmissions at block 640 and is used by cooperation UEs for RSRP-based power control and RRM measurement/CSI report to the TUE at block 642.

In block 644, CUEs sequentially multicast Ack or negative Ack (Nack) within the cooperation cluster.

In block 646, the TUE determines whether at least one Ack has been received. If at least one Ack is not received by TUE, then in block 652 a Nack is sent. Blocks 630, 632 which follow block 652 are described in detail further below.

If at least one Ack is received by TUE, then in block 656 the TUE multicasts D2D cooperation cluster control information. This step is grant-based/scheduled.

In block 658, the CUEs perform synchronous group LBT to forward cooperation information to the TUE.

In block 660, the TUE combines received messages from CUEs with its own received message.

In block 662, the TUE determines whether it the TUE has successfully decoded the packet. If the TUE successfully decodes packed, then in block 666 an Ack is sent. Blocks 630, 632 which follow block 666 are described in detail further below.

If TUE does not successfully decodes packet, then in block 670 a Nack is sent, and the method loops back to block 656.

The method continues with block 630 following any one of blocks 628, 652, 666. In block 630, the TUE feeds back Ack or Nack to the TRP on the licensed band. In block 632, the network flushes the HARQ buffer or prepares HARQ retransmission depending on Ack or Nack feedback and timer expiry. The method then continues with block 612.

In this example, blocks 636, 644, 656, 658, 660 and related steps are part of the D2D Cooperation Phase which takes place in the unlicensed spectrum.

FIG. 7 is a flowchart of a delay-sensitive cooperative unicast scenario. The method features a grant-free (autonomous) D2D cooperation phase, and a 2-level HARQ mechanism.

Blocks 700 and 712 are the same as corresponding steps 600 and 612 previously described with reference to FIG. 6.

In block 722, the network multicasts a packet on the Physical Downlink Shared CHannel (PDSCH) and initiates a timer.

In block 724, CUEs that successfully decode the packet grantlessly perform synchronous group LBT to forward cooperation information to the TUE.

In block 726, the TUE combines received messages from CUEs with its own received message.

In block 728, if the TUE successfully decodes the packet, then at block 732 an Ack is sent. At block 734 TUE feeds back an Ack to network. Typically this is done on a licensed basis. At block 736, network flushes HARQ buffer or prepares HARQ retransmission depending on Ack feedback and timer expiry.

If in block 728 TUE does not successfully decode the packet, then at block 740 a Nack is sent. The method then continues by looping back to block 724.

In this example, blocks 722-728 are the D2D Cooperation Phase, which takes place in the unlicensed spectrum.

FIG. 8 is a flowchart of a cooperative multicast scenario. The method features a grant-free (autonomous) D2D cooperation phase, and a 2-level HARQ mechanism.

Blocks 800 and 812 are the same as corresponding steps 600 and 612 previously described with reference to FIG. 6.

In block 822, the network multicasts a packet on the PDSCH and initiates a timer.

In block 824, CUEs that successfully decode the packet autonomously perform group LBT for mutual multicast of cooperation information. For example, this can be done using a two dimensional-virtual full duplex (2D-VFD) approach. An example of the 2D-VFD approach is described below with reference to FIG. 13A.

In block 826, each TUE combines received messages with its own received message and multicasts an Ack/Nack within its cooperation cluster.

In block 828, if the cluster head UE successfully decodes packet or receives an Ack from all TUEs, then at block 832 a Ack is sent. At block 834, the cluster head UE feeds back the Ack to the TRP. This is typically done in the licensed spectrum. In block 836, the network flushes the HARQ buffer or prepares HARQ retransmission depending on Ack feedback and timer expiry.

If in block 828, the cluster head UE does not successfully decode the packet or receive an Ack from all TUEs, then at block 840 a Nack is sent and the method loops back to block 824.

In this example, blocks 822-828 are the D2D Cooperation Phase, which takes place in the unlicensed spectrum.

Some embodiments are configured to satisfy various constraints or regulations affecting D2D device mesh transmission format. In a specific example, from ETSI EN 301 893 V.1.7.1 (2012-06), the following requirements apply to any unlicensed spectrum transmissions in the 5 GHz band:

- The nominal channel bandwidth shall be at least 5 MHz at all times. The nominal channel bandwidth is the widest band of frequencies, inclusive of guard bands, assigned to a single channel.
- The occupied channel bandwidth shall be between 80% and 100% of the declared nominal channel bandwidth. In case of smart antenna systems (devices with multiple transmit chains) each of the transmit chains shall meet this requirement. The occupied channel bandwidth is the bandwidth containing 99% of the power of the signal.
- A power constraint and per MHz power spectral density (PSD) constraint requires that a signal which occupies a small portion of the nominal bandwidth cannot be transmitted at the maximum transmission power available at the UE due to the PSD constraint.

The constraints or regulations in place for a given application may have an effect on the specifics of implementation. Examples of how these constraints may be applied are given below. However, it should be understood that the bandwidth and power constraints are specific examples. The methods and systems described herein can be adapted to different contexts in which such constraints are not in place, or in which differing constraints are in place.

D2D CCCG transmission formats that may be used in some embodiments include OFDMA, f-OFDMA, SC-FDMA, Localized (contiguous) subcarrier mapping, F-SC-FDMA, DFDMA, IFDMA, and RBG-Interleaved FDMA or clustered DFT-Spread OFDM, for example multi-cluster non-contiguous resource allocation. Example implementation details for some of these transmission formats will now be described.

Single-Carrier FDMA (SC-FDMA)

SC-FDMA uses localized subcarrier mapping. Note that without the DFT precoding step, SC-FDMA becomes the same as OFDMA. So all the embodiments of this invention described for SC-FDMA, DFDMA, IFDMA, RBG-Interleaved FDMA and the filtered versions thereof also apply for OFDMA and its filtered version f-OFDMA if the DFT precoding step is not considered at the transmitter side. In some embodiments, to satisfy an unlicensed spectrum constraint on nominal channel bandwidth being at least 5 MHz, then an SC-FDMA waveform is used and each CUE is allocated at least a 5 MHz bandwidth. For a 20 MHz unlicensed channel, 4 CUEs belonging to the same or different UE cooperation groups can share the channel with little or no co-channel interference. More generally, the SC-FDMA waveform for each CUE may be allocated a bandwidth that satisfies one or more predetermined constraints.

Figure 9:
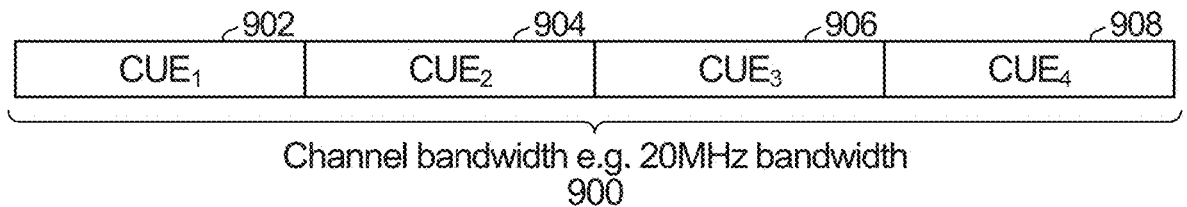
FIG. 9 is an example of bandwidth utilization for SC-FDMA.
Figure 10:
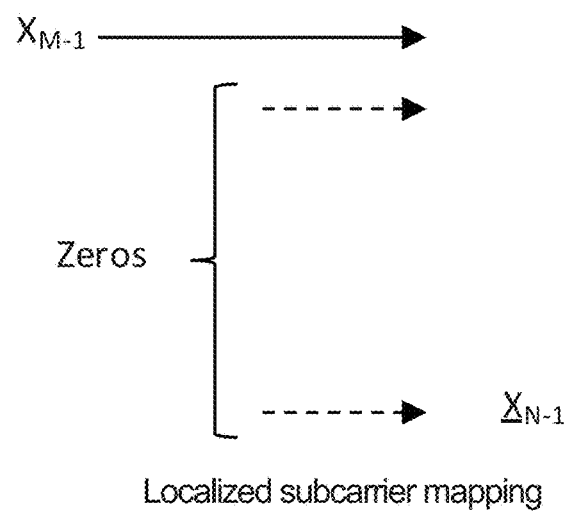
FIG. 10 is an example of localized subcarrier mapping for SC-FDMA.

An example of spectrum allocation for SC-FDMA is depicted in FIG. 9. An unlicensed channel bandwidth is indicated at 900, for example 20 MHz. $CUE_1$ is allocated 5 MHz at 902 as a nominal bandwidth for a given transmit opportunity. As noted above, up to 4 CUEs can share the bandwidth with little co-channel interference. For example, the 20 MHz channel bandwidth 900 is shown divided into CUE bandwidths 902, 904, 906, 908 for $CUE_1$, $CUE_2$, $CUE_3$, and $CUE_4$ respectively. An example of localized subcarrier mapping is shown in FIG. 10.

In some embodiments, spatial processing, for example Multi-User Multiple-Input, Multiple Output (MU-MIMO) techniques, is employed to allow a larger number of CUEs to share the same channel.

Declared nominal channel bandwidth can be configured semi-statically and selected from pre-configured candidate 5 MHz spectrum chunks in each 20 MHz unlicensed spectrum channel.

In order to ensure the CUEs' data arrives synchronously at the TUE, timing advance/offsets may be applied to the SC-FDMA waveform transmitted by the CUEs. In some embodiments, timing advance signaling is employed to set up the timing advance/offsets.

Filtered Single-Carrier FDMA (F-SC-FDMA)

F-SC-FDMA applies a time-windowed band pass filter on the mapped sub-carrier samples of each CUE. The F-SC-FDMA waveform can operate in a similar way to the SC-FDMA waveform, for example by configuring CUEs to operate on 5 MHz nominal channel bandwidths.

Some advantages of F-SC-FDMA over SC-FDMA include:
- relaxed synchronization requirements (no need for timing advance signaling);
- better spectral containment (reduce leakage to adjacent CUEs); and
- more robustness to carrier frequency offset (CFO) mismatch between CUEs and TUEs.

Like SC-FDMA, F-SC-FDMA puts some restrictions on the multiplexing of UEs in the unlicensed spectrum. For example, 5 MHz spectrum chunks for only 4 UEs can be simultaneously frequency multiplexed on a 20 MHz channel. In some embodiments, more UEs can be accommodated through the use of spatial processing.

Distributed FDMA (D-FDMA)

D-FDMA applies distributed subcarrier mapping with fixed spacing between occupied subcarriers, as opposed to localized subcarrier mapping used by SC-FDMA and F-SC-FDMA. Distributed subcarrier mapping is advantageous in the unlicensed spectrum because it allows multiplexing of UEs in the frequency domain using a comb-like interleaving structure while conforming with unlicensed spectrum regulations.

In some embodiments, resource allocation is controlled via controlling the frequency spacing between subcarriers, as well as shifting of the mapped sub-carriers in the frequency domain.

Although sub-band filtering is not applied to D-FDMA, D-FDMA allows more flexibility in multiplexing UEs across the unlicensed spectrum than SC-FDMA, due to the bandwidth occupancy regulations in the unlicensed spectrum.

D-FDMA has similar peak average power ratio (PAPR) properties to L-FDMA (SC-FDMA), and D-FDMA can be combined with flexible nominal channel bandwidth.

Figure 11:
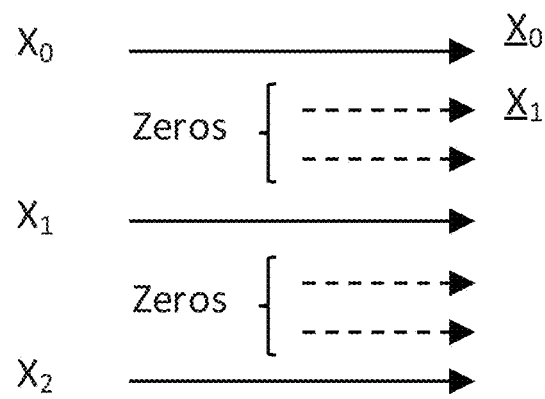
FIG. 11 is an example of distributed subcarrier mapping for SC-FDMA.
Figure 11:
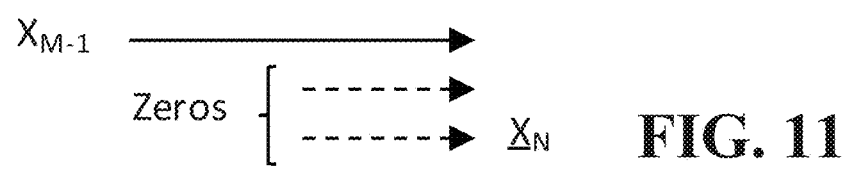

FIG. 11 is an example of a distributed subcarrier mapping.

Interleaved FDMA (I-FDMA)

I-FDMA is a special case of D-FDMA where the mapped sub-carriers span the whole bandwidth for a given channel; i.e., $N=Q*M$, where Q is the equidistance factor between the mapped subcarriers. N is the total number of subcarriers. M is the number of subcarriers allocated to one UE. I-FDMA has lower PAPR compared to SC-FDMA and D-FDMA because its modulated time domain symbols are simply a repetition of the original input symbols.

One advantage of I-FDMA over D-FDMA and SC-FDMA is the lower complexity at the transmitter side because the modulated symbols can be generated strictly in the time domain, without a need for DFT/IDFT at the transmitter.

Figure 12:
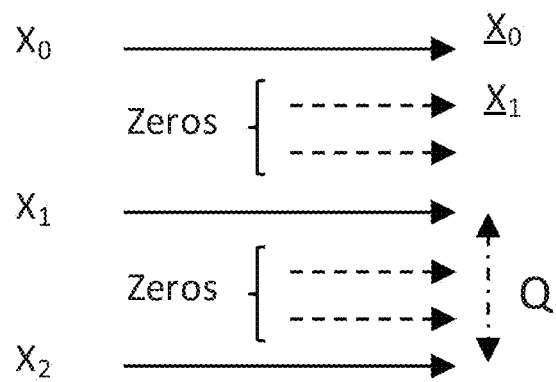
FIG. 12 is an example of distributed subcarrier mapping for interleaved FDMA.
Figure 12:
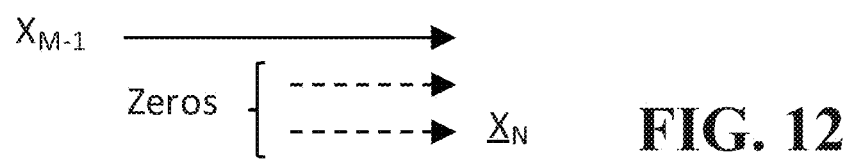

FIG. 12 is an example of a distributed subcarrier mapping. Resource Block (RB)-Interleaved FDMA RB-Interleaved FDMA, also called Clustered DFT-Spread OFDM, is a multi-cluster version of SC-FDMA in which multiple non-contiguous resource clusters are allocated to a single UE within a single carrier. In some embodiments, a simplified version of clustered DFT-Spread OFDM with up to 2 non-contiguous cluster resource allocations per UE is employed.

The PAPR of Clustered-DFT-Spread OFDM is slightly worse than that of SC-FDMA. Depending on the size of the each cluster, filtering can be applied to clustered DFT-Spread OFDM.

In some embodiments, an RB-I-FDMA system is designed such that each UE occupies at least one RB per MHz of spectrum. This permits the UE to transmit at full power and spread its signal across the whole carrier in order to fulfill the 80% bandwidth occupancy requirement and per MHz PSD constraint in the unlicensed spectrum.

If the UE resource allocation is not spread over a large enough bandwidth, then a UE may use its full power to transmit because of the per MHz power spectral density constraint in the unlicensed spectrum.

Transmitting with more power results in a larger coverage area and therefore reaching the TUEs and also silencing more potential interferers because they would sense the channel is busy. The D-FDMA, I-FDMA and RBG-I-FDMA waveforms described above are more suitable for UE cooperation in the unlicensed spectrum than conventional SC-FDMA waveforms. They feature better UE multiplexing capability in the frequency domain, and allow conformance with 80% bandwidth occupancy requirements and per MHz PSD constraints in the unlicensed spectrum.

A disadvantage of D-FDMA and I-FDMA interleaved waveforms compared to SC-FDMA and F-SC-FDMA waveforms is that they cannot be used in conjunction with filtering and therefore cannot benefit from relaxed synchronization requirements and better protection against ICI provided by the sub-band filtering operation.

RB/RBG Interleaved FDMA allows meeting the bandwidth occupancy requirements and power density constraints of the unlicensed spectrum, and can be used in conjunction with filtering to allow more robustness against ICI and relaxing of synchronization requirements between cooperating UEs as well as CFO mismatch between CUEs and TUE. Disadvantages of RB-Interleaved FDMA include the relatively higher PAPR compared to D-FDMA and I-FDMA and the added complexity at the terminal side given that multiple subband filters need to be used. Also, due to the frequency localization of the subband filters which need to be quite small (one RB or a couple of RBs), filtering performance can be degraded.

In some embodiments, a group-based flexible nominal bandwidth configuration is combined with a filtered version of RB-interleaved FDMA waveform in order to leverage the benefits of both approaches. The group-based flexible nominal bandwidth configuration allows multiplexing different UE cooperation groups across adjacent nominal channel bandwidths without co-channel interference between different groups. The Filtered-Interleaved waveform (RB-level interleaving) allows multiplexing different CUEs within the same nominal channel bandwidth while meeting bandwidth occupancy requirements and PSD constraints in unlicensed spectrum. This relaxes synchronization requirements and provides robustness against ICI and CFO mismatch between CUEs and TUE, owing to the use of RB-level sub-band filtering.

As noted above, in some embodiments a two dimensional-virtual full duplex (2D-VFD) approach is employed. An example of the 2D-VFD approach will now be described below with reference to FIG. 13.

Shown is an example of a muting pattern, generally indicated at 1300, for a 2D-VFD scenario where 10 UEs mutually broadcast information to each other within a given TXOP consisting of 5 TTUs. The pattern indicates which UEs are listening in a half duplex manner during a given TTU, and which UEs transmit in a half duplex manner during a given TTU.

Padding can be used when UEs are silent in order not to lose access to the channel (e.g., to other WiFi nodes).

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to mplement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

I claim:

1. A method for wireless communication comprising:
a first user equipment (UE) receiving a multicast signal from a wireless network over a first spectrum band, the multicast signal comprising downlink information targeted to a second UE, the multicast signal addressed to a cluster of UEs including the first UE and at least one other UE;
responsive to receiving the multicast signal, the first UE performing a contention procedure for a sidelink transmission opportunity (TXOP) in a second spectrum band in accordance with group listen-before-talk (LBT) parameters configured for the cluster of UEs; and when the contention procedure has acquired a TXOP in the second spectrum band for the cluster, the first UE making a sidelink transmission containing at least a portion of the downlink information to the second UE over the second spectrum band during the TXOP;

wherein the first spectrum band does not overlap with the second spectrum band.

2. The method of claim 1, wherein the first spectrum band is a licensed spectrum band and the second spectrum band is an unlicensed spectrum band.

3. The method of claim 2, wherein the first UE receiving a multicast signal comprises the first UE receiving the multicast signal over the first spectrum band using a unified air interface and the first UE sending at least a portion of the downlink information comprises the first UE sending the at least a portion of the downlink information to the second UE over the second spectrum band using the unified air interface.

4. The method of claim 2, wherein the first UE receiving a multicast signal comprises the first UE receiving the multicast signal over the first spectrum band using a first air interface and the first UE sending at least a portion of the downlink information comprises the first UE sending the at least a portion of the downlink information over the second spectrum band using a second air interface.

5. The method of claim 1, further comprising the first UE receiving transmission control information for the second spectrum band from the wireless network, the second UE, or another UE in the group, wherein the first UE sending at least a portion of the downlink information to the second UE comprises the first UE sending the at least a portion of the downlink information to the second UE over the second spectrum band in accordance with the transmission control information.

6. The method of claim 1, further comprising the first UE receiving the group LBT parameters from the wireless network over the first spectrum band.

7. The method of claim 1, wherein the first UE performing in a contention procedure for a TXOP in the second spectrum band comprises the first UE performing a LBT procedure as a cluster leader UE (LUE) on behalf of the cluster in accordance with the group LBT parameters configured for the cluster.

8. The method of claim 7, further comprising the first UE sending time-frequency synchronization information to the cluster over the second spectrum band.

9. The method of claim 1, wherein the first UE performing in a contention procedure for a TXOP in the second spectrum band comprises the first UE performing in a group LBT procedure synchronously with other UEs of the cluster in accordance with the group LBT parameters configured for the cluster.

10. The method of claim 9, wherein the first UE performing in the group LBT procedure synchronously with other UEs of the cluster comprises the first UE performing a frame-based equipment (FBE) LBT procedure synchronously with other UEs of the cluster.

11. The method of claim 9, wherein the first UE performing in the group LBT procedure synchronously with other UEs of the cluster comprises the first UE performing a load-based equipment (LBE) LBT procedure synchronously with other UEs of the cluster.

12. The method of claim 1, further comprising the first UE receiving time-frequency synchronization information from the wireless network over the first spectrum band and using the time-frequency synchronization information to synchronize communication within the cluster over the second spectrum band.

13. The method of claim 1, further comprising:

the first UE, in response to receiving a negative acknowledgement (NACK) from the second UE over the second spectrum band:

performing the contention procedure for another TXOP in the second spectrum band in accordance with the group LBT parameters; and where the contention procedure has acquired another sidelink TXOP in the second spectrum band for the cluster, re-sending the at least a portion of the downlink information to the second UE in another sidelink transmission over the second spectrum band during the another TXOP acquired for the cluster.

14. The method of claim 1, further comprising the first UE receiving a group LBT synchronization time or boundary from the wireless network or from a target UE or from a leader UE.

15. A user equipment (UE) device comprising:

a wireless interface;

a processor operatively coupled to the wireless interface; and a computer readable storage medium operatively coupled to the processor, the computer readable storage medium storing instructions for execution by the processor, the programming comprising instructions to:

receive, via the wireless interface, a multicast signal from a wireless network over a first spectrum band, the multicast signal comprising downlink information targeted to a second UE, the multicast signal addressed to a cluster of UEs including the first UE and at least one other UE;

responsive to receiving the multicast signal, perform a contention procedure for a sidelink transmission opportunity (TXOP) in a second spectrum band in accordance with group listen-before-talk (LBT) parameters configured for the cluster of UEs; and where the contention procedure has acquired a TXOP in the second spectrum band for the cluster, make, via the wireless interface, a sidelink transmission containing at least a portion of the downlink information to the second UE over the second spectrum band during the TXOP acquired for the cluster;

wherein the first spectrum band does not overlap with the second spectrum band.

16. The UE of claim 15, wherein the first spectrum band is a licensed spectrum band and the second spectrum band is an unlicensed spectrum band.

17. The UE of claim 15, wherein the instructions further comprise instructions to receive, via the wireless interface, the group LBT parameters from the wireless network over the first spectrum band.

18. The UE of claim 15, wherein the instructions to perform a contention procedure for a TXOP in the second spectrum band comprise instructions to perform a LBT procedure as a cluster leader UE (LUE) on behalf of the cluster in accordance with the group LBT parameters configured for the cluster.

19. The UE of claim 18, wherein the instructions further comprise instructions to send time-frequency synchronization information to the cluster of UEs over the second spectrum band.

20. The UE of claim 18, wherein the instructions further comprise instructions to send resource control information to the cluster of UEs over the second spectrum band, the resource control information indicating an allocation of transmission resources within the second spectrum band to the UEs of the cluster.

21. The UE of claim 17, wherein the instructions to perform a contention procedure for a TXOP in the second spectrum band comprise instructions to perform a group LBT procedure synchronously with other UEs of the cluster in accordance with the group LBT parameters configured for the cluster.

22. The UE of claim 21, wherein the instructions to perform a group LBT procedure synchronously with other UEs of the cluster comprise instructions to perform a frame-based equipment (FBE) LBT procedure synchronously with other UEs of the cluster.

23. The UE of claim 21, wherein the instructions to perform a group LBT procedure synchronously with other UEs of the cluster comprise instructions to perform a load-based equipment LBE LBT procedure synchronously with other UEs of the cluster.

24. The UE of claim 21, wherein the instructions further comprise instructions to receive a time-frequency synchronization signal from the second UE over the second spectrum band, and instructions to and at least one of:
use the time-frequency synchronization signal to perform a channel estimation in the second spectrum band;
use the time-frequency synchronization signal to decode a control channel in the second spectrum band; and
use the time-frequency synchronization signal as a timing reference to send the at least a portion of the downlink information to the second UE over the second spectrum band during the TXOP acquired for the cluster.

25. The UE of claim 15, wherein the instructions further comprise instructions to receive time-frequency synchronization information from the wireless network over the first spectrum band and instructions to use the time-frequency synchronization information to synchronize communication within the cluster over the second spectrum band.

26. The UE of claim 15, wherein the instructions further comprise instructions to:
in response to receiving a negative acknowledgement (NACK) from the second UE over the second spectrum band, perform another TXOP in the second spectrum band in accordance with the group LBT parameters; and
where the contention procedure has acquired another TXOP in the second spectrum band for the cluster, re-sending the at least a portion of the downlink information to the second UE over the second spectrum band during the another TXOP acquired for the cluster.

27. A method for wireless communication comprising:
a network device sending to a cluster of UEs over a first spectrum band, information regarding group listen-before-talk (LBT) parameters for the cluster of UEs to use in a contention procedure for a sidelink transmission opportunity (TXOP) in a second spectrum band, wherein the first spectrum band does not overlap with the second spectrum band; and
the network device transmitting a multicast signal addressed to the cluster of UEs over the first spectrum band, the multicast signal comprising downlink information targeted to a another UE.

28. The method of claim 27, wherein the first spectrum band is a licensed spectrum band and the second spectrum band is an unlicensed spectrum band.

29. The method of claim 27, wherein the network device sending information regarding group listen-before-talk (LBT) parameters comprises the network device sending information regarding group LBT parameters for a frame-based equipment (FBE) LBT procedure.

30. The method of claim 27, wherein the network device sending information regarding group listen-before-talk (LBT) parameters comprises the network device sending information regarding group LBT parameters for a load-based equipment (LBE) LBT procedure.

31. The method of claim 27, wherein the network device sending, over the first spectrum band, information to the cluster of UEs regarding group listen-before-talk (LBT) parameters for the cluster to use in the second spectrum band comprises sending the information over a control channel in the first spectrum band.

* * * * *